(12) United States Patent
Kovacic et al.

(10) Patent No.: US 8,707,808 B2
(45) Date of Patent: Apr. 29, 2014

(54) SENSOR ATTACHMENT AND MOTOR VEHICLE

(75) Inventors: Marko Kovacic, Ismaning (DE);
Stephan Stumpf, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1315 days.

(21) Appl. No.: 11/851,054

(22) Filed: Sep. 6, 2007

(65) Prior Publication Data
US 2008/0053256 A1   Mar. 6, 2008

(30) Foreign Application Priority Data
Sep. 6, 2006   (DE) .......................... 10 2006 041 890

(51) Int. Cl.
*G01D 11/30*   (2006.01)

(52) U.S. Cl.
USPC ........................................ 73/866.5; 165/11.1

(58) Field of Classification Search
USPC ................... 73/431, 866.5; 165/11.1
See application file for complete search history.

(56) References Cited

U.S. PATENT DOCUMENTS

| | | | | |
|---|---|---|---|---|
| 4,662,232 A | * | 5/1987 | Gonsalves et al. | 73/866.5 |
| 5,174,248 A | * | 12/1992 | Couetoux | 123/41.12 |
| 5,997,831 A | | 12/1999 | Dettling et al. | |
| 7,090,658 B2 | * | 8/2006 | Faries et al. | 604/113 |
| 7,226,491 B2 | * | 6/2007 | Choi | 73/114.68 |
| 2005/0077026 A1 | * | 4/2005 | Busch et al. | 165/51 |
| 2006/0078464 A1 | * | 4/2006 | Alleving et al. | 422/62 |
| 2006/0288968 A1 | * | 12/2006 | Damian et al. | 123/41.15 |
| 2008/0021631 A1 | * | 1/2008 | Busch et al. | 701/114 |

FOREIGN PATENT DOCUMENTS

| | | | | |
|---|---|---|---|---|
| DE | 32 36 306 A1 | 4/1984 | | |
| DE | 196 17 494 A1 | 11/1997 | | |
| DE | 103 40 086 A1 | 3/2005 | | |
| DE | 10 2004 015 044 A1 | 10/2005 | | |
| EP | 1 561 923 A1 | 8/2005 | | |
| JP | 2005075343 A | * | 3/2005 | B60K 11/02 |
| JP | 2006017406 A | * | 1/2006 | F25B 49/02 |
| WO | WO 2005093234 A1 | * | 10/2005 | F01P 11/14 |

OTHER PUBLICATIONS

German Search Report dated Jan. 8, 2008 with English translation of relevant portion (Nine (9) pages).

* cited by examiner

*Primary Examiner* — David A Rogers
(74) *Attorney, Agent, or Firm* — Crowell & Moring LLP

(57) ABSTRACT

A sensor attachment device is provided for attaching a sensor device in such a way that removal of the sensor device without damage is ruled out, whereby the sensor device has a pair of holding fingers and a pin. The sensor attachment device has a first and a second pin recess corresponding to the pin of the sensor device. The sensor attachment device has a first and a second pair of holding finger recesses corresponding to the pair of holding fingers of the sensor device, whereby the second pin recess is offset by an offset distance with respect to the first pin recess and whereby the second pair of holding finger recesses is offset by the offset distance with respect to the first pair of holding finger recesses.

16 Claims, 3 Drawing Sheets

SENSOR ATTACHMENT AND MOTOR VEHICLE

BACKGROUND AND SUMMARY OF THE INVENTION

This application claims the priority of German Application No. 10 2006 041 890.5, filed Sep. 6, 2006, the disclosure of which is expressly incorporated by reference herein.

The invention relates to a sensor attachment device and a motor vehicle with a corresponding sensor attachment device.

In the American exhaust gas ordinance (CARB), the emission of non-methane organic gases (NMOG) is limited in the form of a fleet average value for each vehicle manufacturer. It is basically possible to collect NMOG credits. In this way, the fleet average can be lowered with respect to NMOG. Thus, the vehicle manufacturer also has the option of increasing the distance from the lowest emission limit values (SULEV).

For example, the catalytic coating of the vehicle radiator (heat exchanger) offers the possibility of collecting NMOG credits for the purpose of reducing the ozone content of the environmental air. Such a catalytically coated radiator for a motor vehicle is already known from U.S. Pat. No. 5,997,831, with which ozone (O3) in the environment can be converted to oxygen (O2). The named catalytic coating is designated as Direct Ozone Reduction (DOR) by the US authorities. Like all vehicle devices for reducing emissions, this system must also be monitored for its functionality in the scope of the legally-required on-board diagnosis requirements. For this purpose, a sensor device, especially for temperature measurement, is connected to the radiator, especially in order to output a temperature signal to a suitable control device. Since a DOR coating is not active until starting from a temperature of approx. 60 degrees Celsius, the radiator temperature represents a suitable measurement of whether, and for how long, the named conversion process is or was active.

In any case, suitable coated vehicle radiators are significantly more expensive than a standard radiator. A vehicle owner may, therefore, tend to purchase and install a standard radiator as a replacement radiator for a suitable coated vehicle radiator. In order to prevent an error message from the on-board diagnosis system in such a case, it would be necessary to remove the sensor device from the coated vehicle radiator to be replaced and to mount it on the standard replacement radiator. In order to prevent this, for example, the connection between the sensor device and vehicle radiator is designed in such a way that it is impossible to disconnect the sensor device from the vehicle radiator without damaging the sensor device.

Still, it may be possible according to legal regulations to replace the sensor device when it is defective.

The invention is based on the object of providing a technical teaching that makes possible the replacement of a sensor device, which is connected with a sensor attachment device such that removal of the sensor device without damage is ruled out or precluded.

According to the present invention, a sensor attachment device is provided for attaching a sensor device such that removal of the sensor device without damage is ruled out. The sensor device has a pair of holding fingers and a pin. The sensor attachment device has a first and a second pin recess corresponding to the pin of the sensor device. The sensor attachment device further has a first and a second pair of holding finger recesses corresponding to the pair of holding fingers of the sensor device. The second pin recess is offset by an offset distance with respect to the first pin recess, and the second pair of holding finger recesses is offset by the offset distance with respect to the first pair of holding fingers recesses. Advantageous further developments of the invention are described and claimed herein.

Accordingly, the invention is based on providing, in addition to the first sensor attachment device, a second sensor attachment device that corresponds to the first sensor attachment device, but is arranged offset with respect to the position of the first sensor attachment device by an offset distance.

This achieves a situation in which a sensor device, especially a defective one, which is connected to a sensor attachment device such that removal of the sensor device without damage is prevented, can be removed (especially if there is damage to the sensor device) and can be replaced with a replacement sensor device at another location, without the sensor lines, e.g., cable from and/or to the sensor device or the structural environment of the sensor device having to be changed significantly in the scope of the replacement and/or having to make adaptations, especially to the replacement sensor device, before the replacement.

Preferably, a sensor attachment device is provided for attaching a sensor device, whereby the attachment of the sensor device occurs in such a way that with respect to the sensor device, removal of the sensor device (including housing) without damage is ruled out. In this case, the sensor device, especially the housing of the sensor device, has a pair of holding fingers and especially pins arranged between them, in particular a measuring pin. The sensor attachment device has a first and a second pin recess corresponding to the pin of the sensor device, whereby the second pin recess is offset with respect to the first pin recess by an offset distance. In addition, the sensor attachment device has a first and a second pair of holding finger recesses corresponding to holding fingers of the sensor device, whereby the second pair of holding finger recesses is offset with respect to the first pair of holding finger recesses by the offset distance. The second pin recess and the second pair of holding finger recesses are preferably provided for attaching a replacement sensor device.

In this case, the second pin recess and/or the second pair of holding finger recesses preferably lie-offset by the offset distance-along a line that runs through the first pair of holding finger recesses. The first pin recess preferably also lies on this line. The offset distance is preferably smaller than the distance between the holding fingers of a holding finger pair and/or the holding finger recesses of a pair of holding finger recesses.

Because of this, space-saving sensor attachment devices are produced for a replacement sensor device, which in addition makes it possible to attach a standard sensor device (original sensor device) as a replacement sensor device without having to significantly change or adapt the line routing to the sensor device and/or replacement sensor device, or the structures surrounding the sensor device and/or replacement sensor device, especially the so-called packaging.

The scope of the invention also includes a motor vehicle with a heat exchanger, such as an engine radiator, and with a sensor device for detecting a heat-exchanger-related physical variable, particularly the temperature. The sensor device has a pair of holding fingers and a pin, especially a measuring pin containing a measuring sensor. For attaching the sensor device of this type, so that removal of the sensor device free of damage is ruled out, a sensor attachment device is provided that has a first and a second pin recess corresponding to the pin of the sensor device, especially with respect to form. In addition, the sensor attachment device has a first and a second pair of holding finger recesses corresponding to the pair of holding fingers of the sensor device, especially with respect to form. The second pin recess is offset with respect to the first pin recess by an offset distance and the second pair of holding finger recesses is offset by the offset distance with respect to the first pair of holding finger recesses.

Depending on whether a first (original) sensor device or a second (replacement) sensor device, especially of identical construction type, is held in the sensor attachment device, the pins and the holding fingers of the first sensor device work together with the first pin recess and the first pair of holding finger recesses or the pin and the holding finger of the second sensor device work together with the second pin recess and the second pair of holding finger recesses.

Preferably, the heat exchanger includes the sensor attachment device for attaching the sensor device (or is connected with it), especially connected such that a separation of the sensor attachment device from the heat exchanger free of damage—with respect to the heat exchanger or the sensor attachment device—is ruled out.

A reliable connection between the sensor device and the sensor attachment device is ensured in that the sensor device is connected to the sensor attachment device by way of an adhesive that is applied and/or acts especially between the pin recess and the pin.

Especially preferably, the holding fingers each have on their ends a latching tab that is especially designed such that it corresponds with a correspondingly designed holding finger recess and, in particular, engages in it. Preferably, the latching tabs are designed facing each other, in order to save space.

Alternatively to this, the holding fingers correspond to the recesses based on a snap, clip or hook connection, which includes a spring element that engages in a specified fastening position or hooks into an opposing piece.

The advantage of the invention is especially achieved when the pin is connected to the rest of the sensor device by way of a targeted breaking point that is designed in such a way that during removal of the sensor device, the pin remains in a recess corresponding to the pin of the sensor attachment block.

Naturally, it is also within the scope of the invention to include one or more pairs of holding fingers with one or more individual holding fingers. Also, replacing one or more pairs of holding finger recesses with one or more individual holding finger recesses lies within the scope of the invention.

Other objects, advantages and novel features of the present invention will become apparent from the following detailed description of the invention when considered in conjunction with the accompanying drawings.

DETAILED DESCRIPTION OF THE DRAWINGS

Figure 1:
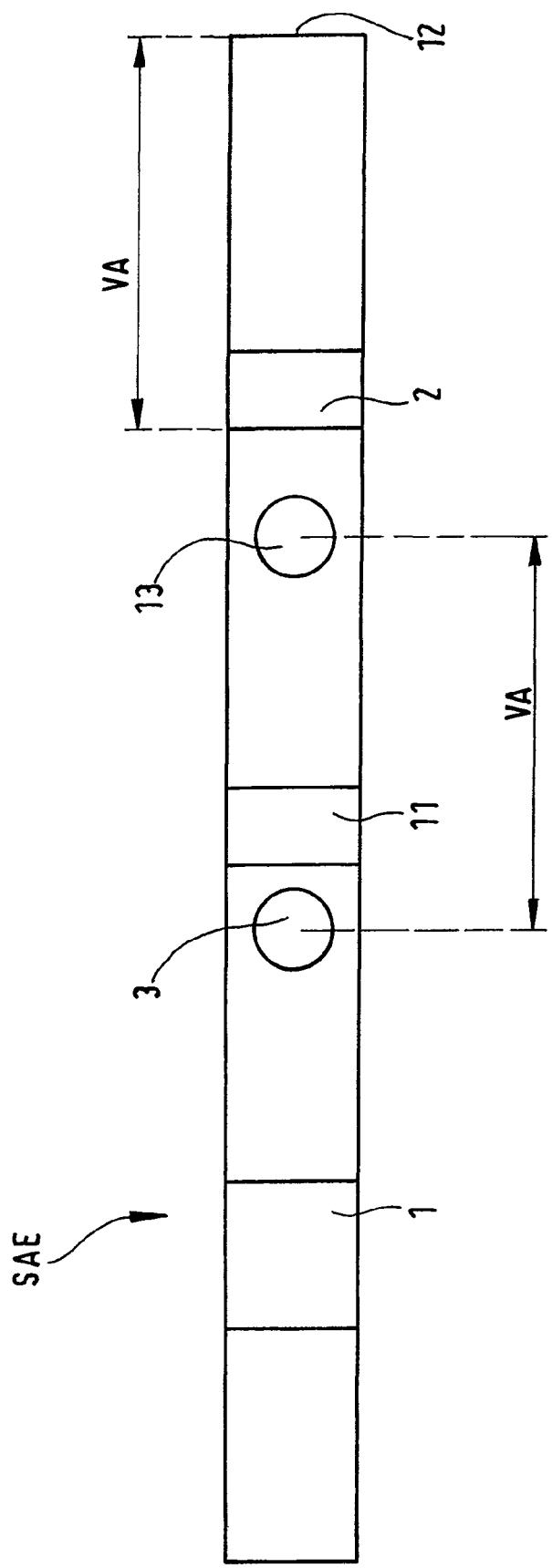
FIG. 1 shows a top view of a sensor attachment device.

FIG. 1 shows a top view of a sensor attachment device SAE that can also be called a sensor attachment block, aluminum insert or aluminum block provided for a sensor device (not shown).

A first pair of holding finger recesses 1, 2 for holding appropriately arranged holding fingers of the sensor device is shown. Offset with respect to these holding finger recesses 1, 2 by an offset distance VA, there is a second pair of holding finger recesses 11, 12 for holding an appropriately designed and mounted holding finger pair (not shown) of a sensor device, especially of a replacement sensor device.

Between the holding finger recesses 1, 2 of the first pair and/or the holding finger recesses 11, 12 of the second pair, a first pin recess 3 and/or a second pin recess 13 is arranged for attaching a correspondingly designed and mounted pin (not shown) of the sensor device. Also, the two pin recesses 3, 13 are arranged offset by the offset distance VA.

Figure 2:
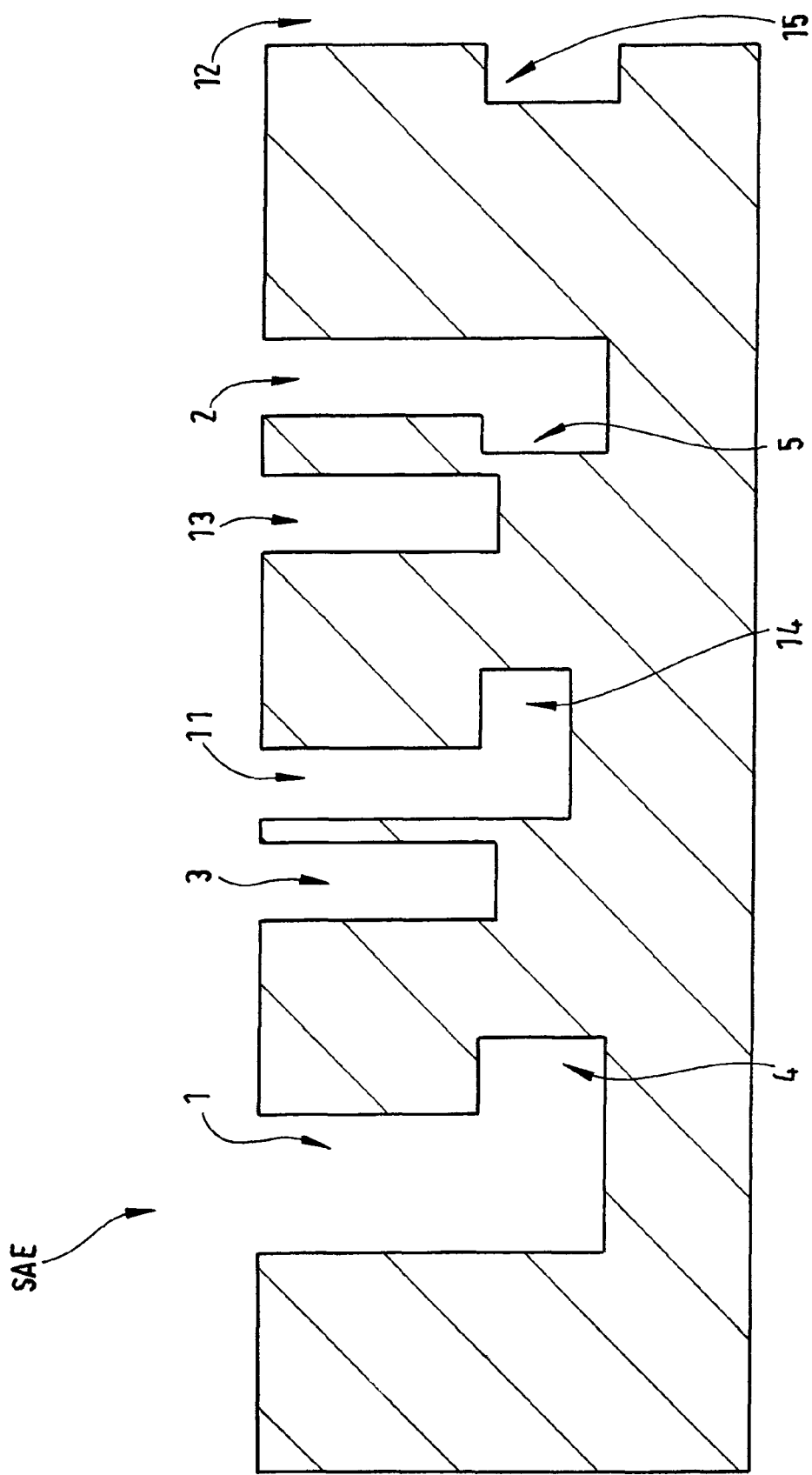
FIG. 2 shows a cross section of a sensor attachment device of FIG. 1.

FIG. 2 shows the sensor attachment device SAE from FIG. 1 in a cross section view. The same reference numbers relate to the same elements.

On the lower end, the holding finger recesses 1, 2, 11, 12 have undercuts 4, 5, 14, 15 in which the latching tab of a holding finger of the sensor device can engage in order to tightly connect the sensor device to the sensor attachment device SAE.

The holding finger recess 12 that is shown on the far right is implemented in the example shown simply by the end of the sensor attachment device SAE. This means that holding finger recesses that have only one limiting side or wall, preferably plus the undercut for the holding finger, are thus also within the scope of the invention. Also, providing holding finger fixing devices instead of holding finger recesses is within the scope of the invention.

Figure 3:
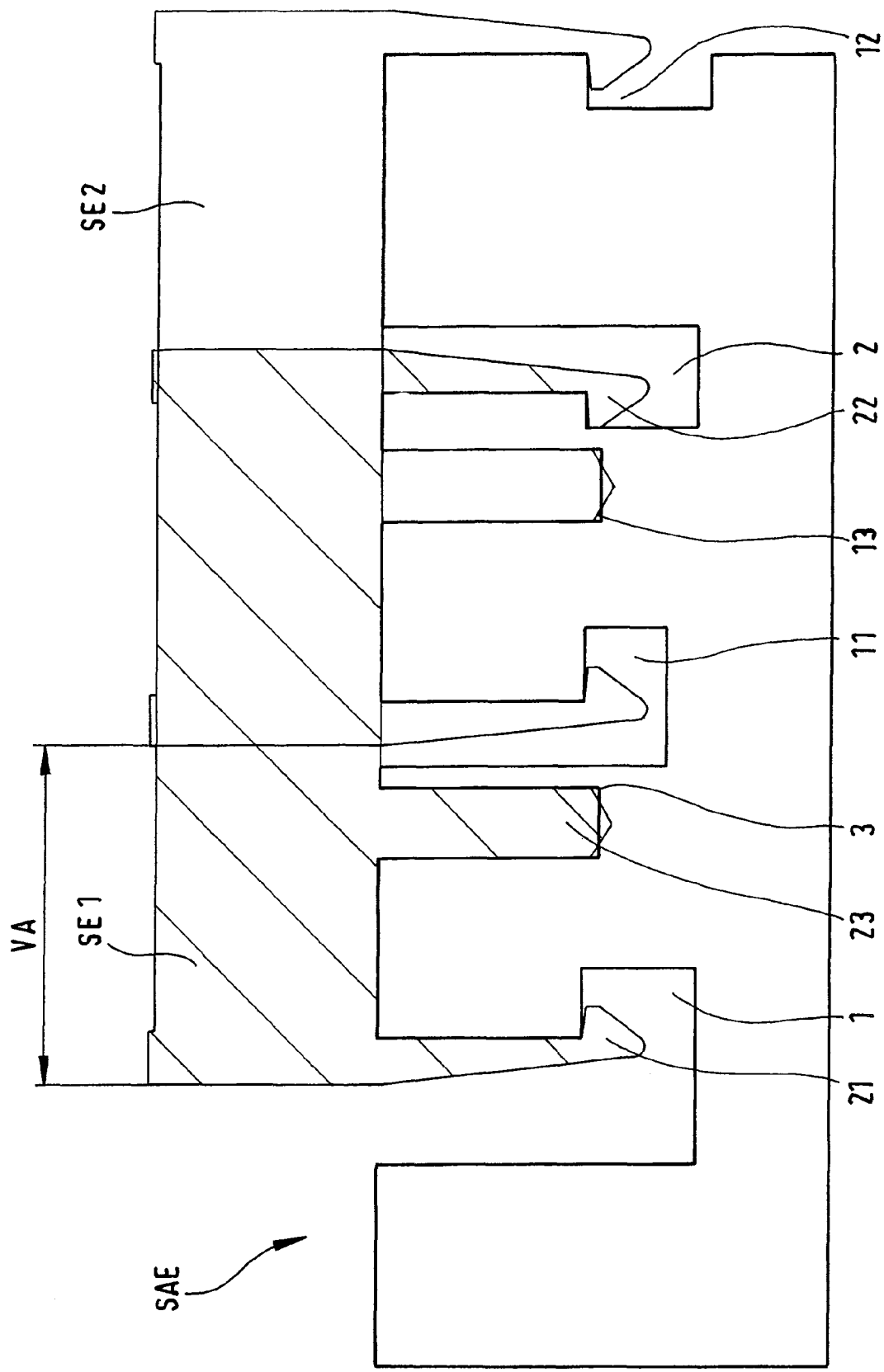
FIG. 3 shows a schematic cross section view of a first and a second sensor device that are attached in a sensor attachment device according to the invention.

In shading, FIG. 3 shows a cross section of a first sensor device SE1 that is attached in, or held by, a sensor attachment device SAE. A second sensor device SE2 is shown without shading, which can be used alternatively to the first sensor device SE1, for example as a replacement sensor device, in which the sensor attachment device SAE can be held. The sensor attachment device SAE corresponds to the sensor attachment device from FIGS. 1 and 2. The same reference numbers relate to the same elements.

The sensor device SE1 for detecting a heat exchanger related physical variable, e.g., the temperature, has a pair of holding fingers 21, 22 and a pin 23. These are held in the first pair of holding finger recesses 1, 2 and the first pin recess 3.

The pin 23 contains a temperature measuring sensor and is connected at the upper end by way of a targeted breaking point (not shown) with the rest of the sensor device SE1 or with the base of the sensor device SE1.

The pin 23 is glued with an adhesive in the pin recess 3, so that the pin 23 will break-off from the rest of the sensor device SE1 when the sensor device SE1 is separated by force from the sensor attachment device SAE. If the sensor device SE1 is defective, it can thus be removed with force from the sensor attachment device SAE. In this case, the pin 23 remains in the pin recess 3.

A replacement sensor device SE2 of the same or similar construction type with corresponding holding fingers and the corresponding pin, offset by the offset distance VA, can be guided with respect to the sensor device SE1 into the second pair of holding finger recesses 11, 12 and the second pin recess 13.

The wiring of the sensor device and/or the replacement sensor device SE2 and the surrounding structures does not have to be significantly adapted or changed for this type of installation of the replacement sensor device SE2, whereby the manufacturing of the vehicle and/or the replacement of the sensor device can be carried out more economically.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   a heat exchanger;
   a sensor device for detecting a heat exchanger related physical variable, the sensor device having a first pair of holding fingers and a first pin;
   a sensor attachment device for attaching a sensor device such that removal of the first sensor device without damage is precluded or for attaching a second sensor device having a second pair of holding fingers and a second pin after removal of the damaged first sensor device, the sensor attachment device comprising:
      a first and a second pin recess operatively configured in the sensor attachment device to correspond with the respective first and second pins of the first and second sensor devices; and
      a first and a second pair of holding finger recesses operatively configured in the sensor attachment device to correspond to the respective first and second pairs of holding fingers of the first and second sensor devices;
      wherein the second pin recess is offset by an offset distance with respect to the first pin recess, and the second pair of holding finger recesses are offset by the same offset distance with respect to the first pair of holding finger recesses and has one of the holding fingers between the first and second pin recess for accommodating a replacement sensor device in lieu of the first sensor device whose pin remains at least partially in the first pin recess upon removal of the first sensor device.

2. The motor vehicle according to claim 1, wherein the other of the holding fingers of the second pair arranged to engage a recess on an end face of the sensor attachment device.

3. The motor vehicle according to claim 1, wherein the sensor attachment device is integrated in the heat exchanger.

4. The motor vehicle according to claim 3, wherein each holding finger of the pair of holding fingers has a latching tab at a free end.

5. The motor vehicle according to claim 3, wherein the sensor device comprises a targeted break point between the pin of the sensor device and a body of the sensor device, whereby during removal of the sensor device the pin breaks-off and remains in the pin recess of the sensor attachment device that corresponds to the pin.

6. The motor vehicle according claim 3, further comprising an adhesive operatively configured to connect the sensor device to the sensor attachment device, the adhesive being located at least between the pin recess and the pin.

7. The motor vehicle according to claim 6, wherein the sensor device comprises a targeted break point between the pin of the sensor device and a body of the sensor device, whereby during removal of the sensor device the pin breaks-off and remains in the pin recess of the sensor attachment device that corresponds to the pin.

8. The motor vehicle according to claim 1, wherein the sensor attachment device is fixedly secured to the heat exchanger.

9. The motor vehicle according claim 8, further comprising an adhesive operatively configured to connect the sensor device to the sensor attachment device, the adhesive being located at least between the pin recess and the pin.

10. The motor vehicle according to claim 8, wherein each holding finger of the pair of holding fingers has a latching tab at a free end.

11. The motor vehicle according to claim 8, wherein the sensor device comprises a targeted break point between the pin of the sensor device and a body of the sensor device, whereby during removal of the sensor device the pin breaks-off and remains in the pin recess of the sensor attachment device that corresponds to the pin.

12. The motor vehicle according claim 1, further comprising an adhesive operatively configured to connect the sensor device to the sensor attachment device, the adhesive being located at least between the pin recess and the pin.

13. The motor vehicle according to claim 12, wherein each holding finger of the pair of holding fingers has a latching tab at a free end.

14. The motor vehicle according to claim 13, wherein the sensor device comprises a targeted break point between the pin of the sensor device and a body of the sensor device, whereby during removal of the sensor device the pin breaks-off and remains in the pin recess of the sensor attachment device that corresponds to the pin.

15. A sensor attachment device for attaching a first sensor device having a first pair of holding fingers and a first pin in such a way that removal of the first sensor device without damage is precluded or for attaching a second sensor device having a second pair of holding fingers and a second pin after removal of the damaged first sensor device, the sensor attachment device comprising:
   a first and a second pin recess operatively configured in the sensor attachment device to correspond with the respective first and second pins of the first and second sensor devices; and
   a first and a second pair of holding finger recesses operatively configured in the sensor attachment device to correspond to the respective first and second pairs of holding fingers of the first and second sensor devices;
   wherein the second pin recess is offset by an offset distance with respect to the first pin recess, and the second pair of holding finger recesses is offset by the same offset distance with respect to the first pair of holding finger recesses and has one of the holding fingers between the first and second pin recesses for accommodating a replacement sensor device in lieu of the first sensor device whose pin remains at least partially in the first pin recess upon removal of the first sensor device.

16. The sensor attachment device according to claim 15, wherein the other of the holding fingers of the second pair arranged to engage a recess on an end face of the sensor attachment device.

* * * * *